(12) United States Patent
Neubauer et al.

(10) Patent No.: US 6,748,992 B1
(45) Date of Patent: Jun. 15, 2004

(54) FACILITY FOR MANUFACTURING MULTILAYERED COMPOSITE TUBES

(75) Inventors: Gerhard Neubauer, Königsberg (DE); Frank Gerber, Suhl (DE)

(73) Assignee: Unicor GmbH Rahn Plastmaschinen (DE)

( * ) Notice: Subject to any disclaimer, the term of this patent is extended or adjusted under 35 U.S.C. 154(b) by 0 days.

(21) Appl. No.: 09/889,181

(22) PCT Filed: Jan. 29, 1999

(86) PCT No.: PCT/DE99/00224

§ 371 (c)(1),
(2), (4) Date: Jul. 9, 2001

(87) PCT Pub. No.: WO00/44546

PCT Pub. Date: Aug. 3, 2000

(51) Int. Cl.[7] ............................ B29D 23/00; B29C 47/02
(52) U.S. Cl. ..................... 156/378; 156/463; 156/466; 156/500
(58) Field of Search ................ 156/203, 244.12, 156/244.13, 244.24, 463, 466, 503; 493/273, 292, 293, 294, 302; 222/144; 248/131, 346.03, 349; 221/105, 120, 188; 206/391; 242/551, 558, 559.3, 559.4, 560.3

(56) References Cited

U.S. PATENT DOCUMENTS

| | | | |
|---|---|---|---|
| 3,478,974 A | * 11/1969 | Roscoe et al. | ............... 242/560 |
| 4,838,526 A | * 6/1989 | Iida | .................. 266/80 |
| 4,911,778 A | 3/1990 | Barnoach | |
| 5,223,852 A | * 6/1993 | Oresti et al. | ................... 347/4 |
| 5,580,405 A | * 12/1996 | Palmer | ..................... 156/73.1 |

FOREIGN PATENT DOCUMENTS

| | | |
|---|---|---|
| EP | 0 024 220 | 2/1981 |
| EP | 0 353 977 | 2/1990 |
| EP | 0 581 208 | 2/1994 |
| EP | 0 644 031 | 3/1995 |
| FR | 2 599 667 | 12/1987 |
| GB | 2193463 A | * 2/1988 |

\* cited by examiner

*Primary Examiner*—Jeff H. Aftergut
*Assistant Examiner*—Barbara J. Musser
(74) *Attorney, Agent, or Firm*—Bachman & LaPointe, P.C.

(57) ABSTRACT

Described is an installation (10) for producing multi-layer composite tubes (116). The installation (10) has a metal strip unwinding device (44), a metal strip storage device (48) adjoining the metal strip unwinding device (44), a metal strip shaping device (36) adjoining the metal strip storage device (48), an extruder station (12) adjoining the metal strip shaping device (36), and a cooling device (50) adjoining the extruder station (12). The metal strip shaping device (36) serves for shaping the metal strip (38) which is unwound from the metal strip unwinding device (44) into a metal tube with overlapping longitudinal edges which are welded to form the metal tube by means of a welding station (32) at the extruder station (12). In the extruder station (12) the metal tube is covered with an inner plastic layer in fixedly adhering relationship and with an outer plastic layer in fixedly adhering relationship. The composite tube produced in that way is cooled to ambient temperature in the cooling device (50).

17 Claims, 7 Drawing Sheets

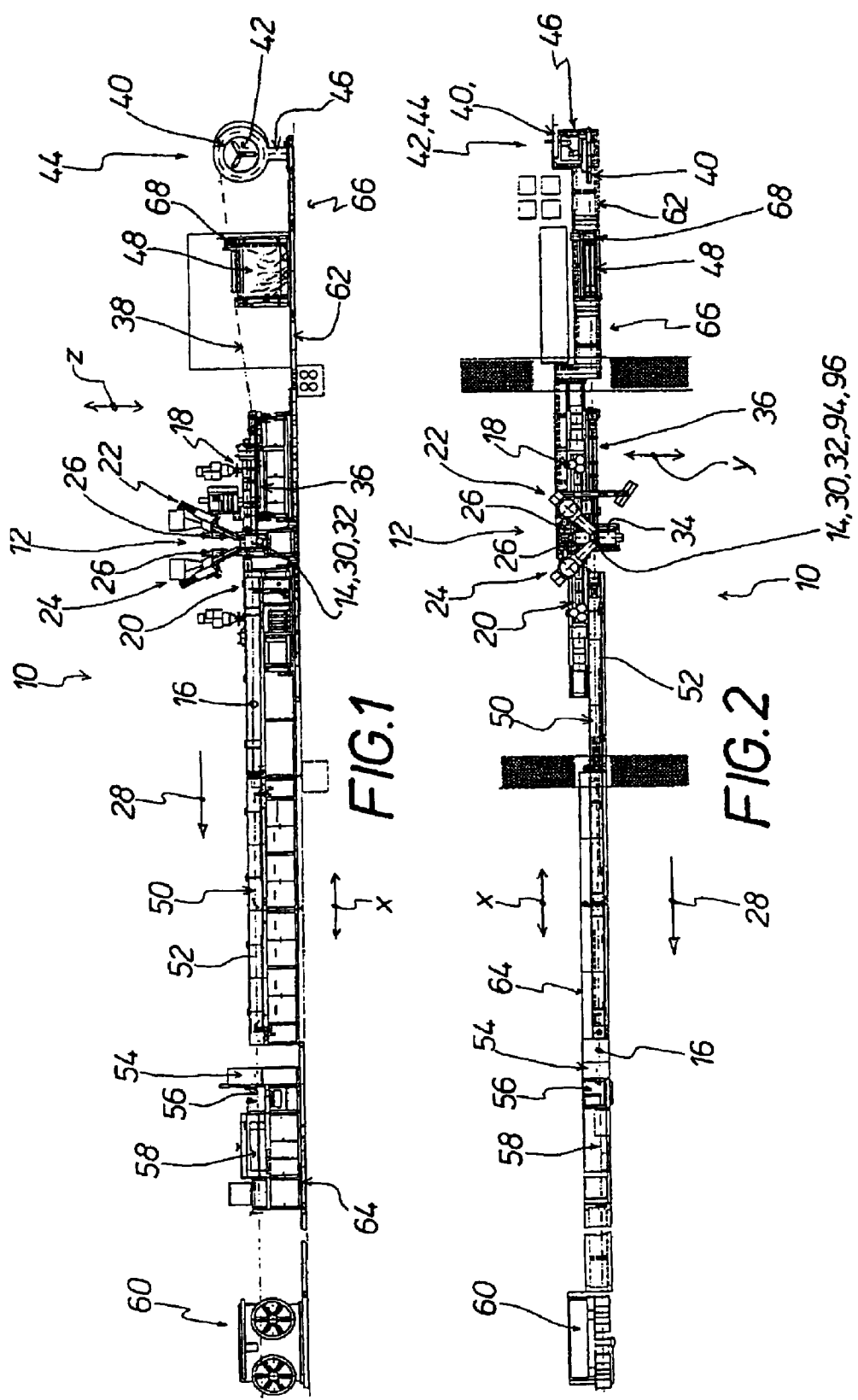

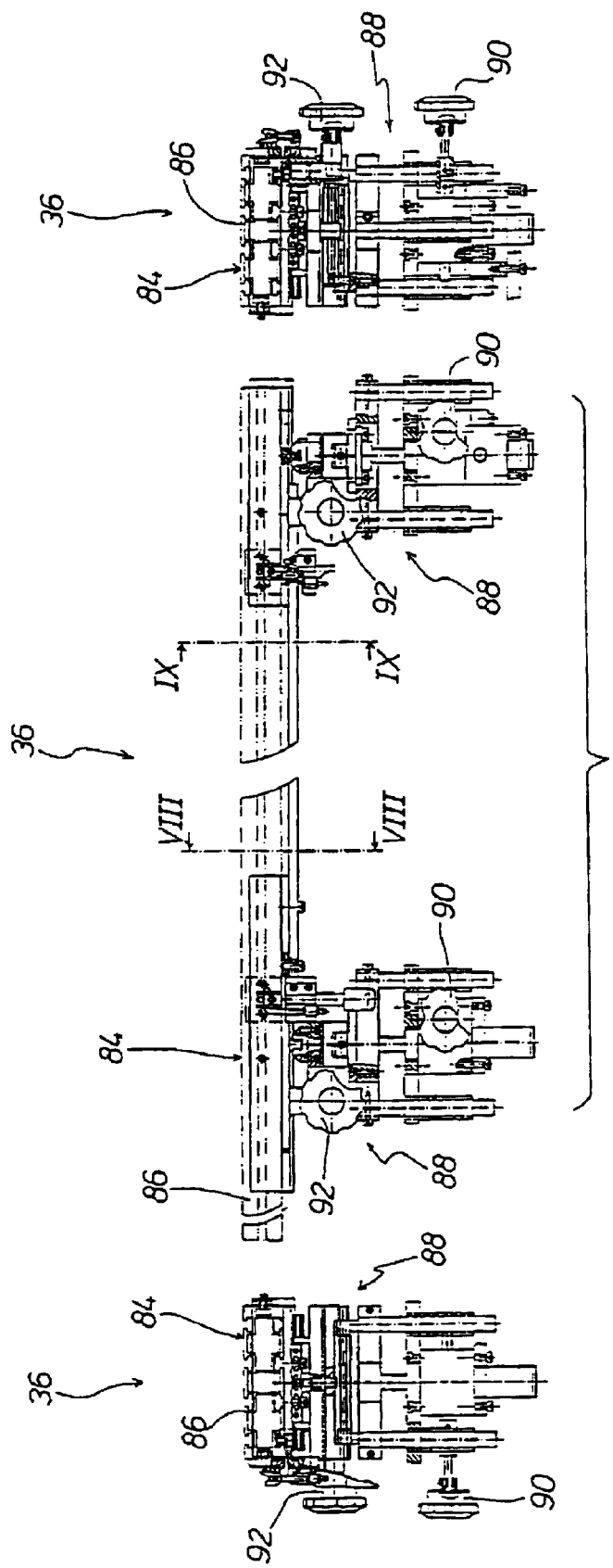

FACILITY FOR MANUFACTURING MULTILAYERED COMPOSITE TUBES

The invention concerns an installation for producing multi-layer composite tubes, comprising a shaping device for shaping a metal strip into a metal tube with overlapping longitudinal edges, a welding device for welding the overlapping longitudinal edges, an extruder station with an extrusion head which adjoins the shaping device and which is connected to a first extruder for applying an inner plastic layer and a second extruder for applying an outer plastic layer to the metal tube, and a cooling device for cooling the multi-layer composite tube, which are arranged in succession in a production line.

Installations of that kind are known per se. In those known installations, the extrusion head is fixedly connected to the first extruder for the inner plastic layer. The second extruder which is provided for the outer plastic layer is spatially separated from the unit consisting of the extrusion head and the first extruder and is suitably connected in flow relationship to the extrusion head. That structure adversely affects both the accuracy of assembly and also the production speed for producing the multi-layer composite tubes. A further deficiency of those known installations is that a change in the composite tube nominal size, that is to say converting the installation from one composite tube diameter to a desired different composite tube diameter, is possible only at the cost of a considerable amount of time and assembly complication.

In consideration of those factors the object of the present invention is to provide an installation of the kind set forth in the opening part of this specification, which, with a comparatively high production speed, permits optimum composite tube quality, while a change in composite tube nominal size is also possible relatively easily and without taking up a great deal of time.

In accordance with the invention, in an installation of the kind set forth in the opening part of this specification, that object is attained in that the extrusion head of the extruder station is disposed stationarily and that the first and the second extruders are arranged facing towards each other in mutual alignment in a line laterally beside the extrusion head in parallel relationship with the production line, wherein the extrusion head in the production line is provided between the first and the second extruders.

In this respect the term 'production line' means the line along which the metal strip moves along the shaping device for shaping the metal strip to form the respective metal tube, to the welding device for welding the overlapping longitudinal edges of the shaped metal strip to form the metal tube, wherein the production line is defined in particular also by the extruder station, that is to say by the extrusion head, and thereafter by the cooling device for cooling the produced multi-layer composite tube. The metal strip or the multi-layer composite tube produced with the installation is moved in a straight line at a given, comparatively high advance speed through the installation. While, in known installations of the kind set forth in the opening part of this specification, with a given composite tube diameter, that is to say nominal size, the advance speed is of the order of magnitude for example of 15 m/min, it is possible with the installation according to the invention and for the same composite tube diameter for the production speed to be increased to the order of magnitude of 25 m/min, that is to say by 67%, in which case that advantage of the installation according to the invention involves the advantages of the possibility of a simple and time-saving change in composite tube diameter with the installation according to the invention being of an arrangement which saves on floor area or space. In particular the fact that, in the installation according to the invention, the extrusion head of the extruder station is stationarily provided alone, that is to say without the first extruder for the inner plastic layer, and the fact that the first and second extruders are provided in alignment with each other in a line in mutually facing relationship laterally beside the extrusion head means that the installation is of a design configuration which saves on floor area, with the advantage that temperature-related changes in length of the two extruders are compensated. That has a positive effect on the accuracy of the installation construction and the accuracy of manufacture of the multi-layer composite tubes produced with the installation according to the invention.

It has proven to be advantageous if, in the installation according to the invention, there are third and fourth extruders for bonding agents, wherein the third extruder is associated with the first extruder for the inner plastic layer and the fourth extruder is associated with the second extruder for the outer plastic layer of the multi-layer composite tube. It will be appreciated that it would also be possible, in an installation according to the invention, for the extruder station to be combined with a single extruder for a bonding agent. That third extruder would then be combined with a switching device for combining the bonding agent both with the first extruder and with the second extruder in order to apply the inner plastic layer and the outer plastic layer in firmly adhering relationship to the metal tube by means of the bonding agent.

The third and the fourth extruders for bonding agent are desirably cardanically mounted to associated stationary column devices. Such a structure correspondingly improves the accuracy of the installation and the productivity thereof because the adjustability thereof is optimised.

In the installation according to the invention it has proven to be advantageous if the welding device has a welding station with an ultrasound welding wheel, wherein the welding station is displaceable in respect of height in relation to the extrusion head in a first direction in space parallel to the production line, in a second direction in space perpendicular thereto transversely with respect to the production line and in a third direction in space perpendicular to the first and second directions in space, and is pivotable about a pivot axis oriented in the first direction in space. That displacement and/or pivotal movement can be implemented pneumatically or mechanically, for example by spindle drives. That displaceability permits not only a time-saving change in nominal size, that is to say the time-saving possibility of converting the installation from one composite tube diameter to a desired different composite tube diameter, but it also affords the considerable advantage that access to the installation is better possible in the case of such changes in nominal size or disturbances in production. Possible disturbances in production can be very rapidly dealt with.

In the installation according to the invention, the ultrasound welding wheel is desirably connected to a drive motor for controlled rotary drive of the welding wheel. By means of the drive motor, the speed of rotation of the ultrasound welding wheel which forms a sonotrode is accurately matched to the advance speed of the installation, that is to say the advance speed of the metal strip which is shaped to form the metal tube, in order to produce a highly accurate metal tube which is provided with the inner and outer plastic layers in firmly adhering relationship.

To produce the highly precise metal tube from the corresponding metal strip, it has proven to be desirable if adjacent to the welding device are two closing roller devices which each have more than two closing rollers which are distributed at the periphery and which adjoin each other. Each of the two closing roller devices may have four mutually adjoining closing rollers.

In order to permit adaptation to different material qualities of metal strips which are to be shaped to form the metal tube, in respect of dimensional tolerances, stiffnesses of the material and so forth, it is desirable if at least some of the closing rollers of the respective closing roller device are radially displaceable.

In accordance with the invention, a precise change in composite tube nominal size is permitted in a still further better fashion if, in the installation according to the invention, the shaping device has a base element on which pairs of shaping rollers are arranged in succession at a spacing from each other in the advance direction of the metal strip to be shaped, wherein the base element is displaceable in the second direction in space transversely with respect to the production line and in the third direction in space vertically and is pivotable about a pivot axis oriented in the second direction in space and about a pivot axis oriented in the third direction in space. Such a linear and virtually cardamic arrangement of the base element means that the pairs of shaping rollers provided thereon are precisely adjustable in such a fashion as to save time, which has an advantageous effect on the level of productivity of the installation according to the invention. In addition, by virtue of this design configuration of the last-mentioned kind, it is also easily possible for the shaping device to be very quickly and accurately converted and set to the respective metal strip width and thus to the desired tube diameter. In this case adjusting wheels can be provided for displacement in the second direction in space and about the pivot axis oriented in the second direction in space, and for displacement in the third direction in space and about the pivot axis oriented in the third direction in space. The adjusting wheels may be for example hand wheels in order to implement suitable manual adjustment.

In the installation according to the invention arranged upstream of the shaping device in the production direction is a metal strip unwinding device which is displaceable in the second direction in space transversely with respect to the production line.

That transverse displaceability of the metal strip unwinding device means that it is advantageously easily possible for the metal strip unwinding device to be accurately set in dependence on the width of the respective metal strip to be processed, that is to say the metal strip unwinding device and thus the respective metal strip can be centered accurately, that is to say exactly, in relation to the production line. That centering displacement of the metal strip unwinding device is possible in a simple fashion and in such a way as to save a great deal of time.

The metal strip unwinding device may have a single reel mounting for a metal strip reel, but it is preferred if the metal strip unwinding device has a support element with two reel mountings, wherein the support element is rotatable about a vertical axis and the two reel mountings are provided at mutually remote sides of the support element. In comparison with a metal strip unwinding device having a single reel mounting, such a design configuration of the last-mentioned kind enjoys the advantage that it is possible to change from an exhausted metal strip reel to an unused fresh metal strip reel in such a way as to save time. That also has an advantageous effect on the level of productivity of the installation according to the invention.

Particularly if, in the installation according to the invention, the metal strip unwinding device has a support element with a single reel mounting, it is desirable If provided between the metal strip unwinding device and the metal strip shaping device is a metal strip storage device which has vertical side walls arranged parallel to each other and to the production line, because it is possible for a suitable end portion or a residual length of the exhausted metal strip reel to be deposited in that metal strip storage device and for the end of that exhausted metal strip to be fixedly connected to the beginning of a fresh metal strip reel. During that operation of joining the two ends, which is desirably effected by ultrasonic welding, the residue of the metal strip, which is in the metal strip storage device, can be continuously subjected to further processing to form the multi-layer composite tube. In that respect, the vertical side walls of the metal strip storage device which are arranged parallel to each other and to the production line provide a guidance effect for the stored length of metal strip.

From the point of view of being able to process metal strips of different strip widths with a high level of productivity on the Installation according to the invention, it is desirable if the side walls of the metal strip storage device are simultaneously displaceable symmetrically in mirror-image relationship with respect to the production line. That displacement can be effected for example by means of a hand wheel which is suitably combined with the two side walls of the metal strip storage device. That can be effected for example by spindle drives and a belt or the like which drives the spindles in common relationship.

In order to provide for cooling of the corresponding initial portion of the multi-layer composite tube even during each start-up phase of operation of the installation according to the invention, that is to say during the operation of filling the cooling device with the cooling liquid, it is desirable if, in the installation according to the invention, the cooling device has an elongate liquid bath with a nozzle device and with composite tube hold-down devices, wherein the nozzle device is formed with mutually spaced nozzle openings which are directed towards the production line. The nozzle openings which are oriented towards the production line, that is to say the multi-layer composite tube, provide that the cooling liquid is already directed during the operation of filling the liquid bath towards the leading-end or initial portion of the multi-layer composite tube in order to produce a suitable cooling effect. The multi-layer composite tube is positioned in a defined fashion in the elongate liquid bath of the cooling device by means of the composite tube hold-down devices, that is to say the multi-layer composite tube is prevented from floating up in the liquid bath. Such a floating effect would be caused by the buoyancy action of the multi-layer composite tube, without the use of the composite tube hold-down devices. That buoyancy action results from the fact that there is a corresponding increased pressure in the interior of the multi-layer composite tube. That increased pressure is necessary in order to precisely form the metal tube with the inner plastic layer firmly adhering thereto.

The respective composite tube hold-down device can have two mutually spaced rollers which are mounted on a pivotal lever. Such a per se known design configuration affords the advantage that metal-layer composite tubes of different nominal diameters can be readily precisely correctly positioned in the elongate liquid bath of the cooling device.

The above-mentioned increased pressure in the interior of the multi-layer composite tube can be produced in per se known manner by a mandrel or bar, as is described for example in EP 0 581 208 B1. In the case of the installation according to the invention, it has been found to be desirable to provide in the liquid bath a tube clamping-off device with squeeze-off jaws, which device can be reciprocated along the liquid bath, and to provide at the beginning of the liquid bath a first actuating device for closing the squeeze-off jaws and for keeping them closed and at the end of the elongate liquid bath a second actuating device for opening the squeeze-off jaws and for keeping them open. The multi-layer composite tube produced in the installation is squeezed off at a given location by means of the squeeze-off jaws of the tube clamping-off device, with the interior of the tube being closed by the inner plastic layer which is still in a plastic condition at that location. That makes It possible to produce a suitable increased pressure in the interior of the tube. In the installation according to the invention, the tube clamping-off device with the squeeze-off jaws can be reciprocated in the elongate liquid bath by electric motor means. The forward movement between the first and second actuating devices is effected in that respect at a speed adapted to the advance speed of the multi-layer composite tube produced in the installation. The return movement from the second actuating device to the first actuating device can also be effected at a higher speed.

In the installation according to the invention, it is desirable if disposed downstream of the cooling device in the production direction is an optical tube monitoring device, a printer, a tube draw-off device and a tube winding-up device. The optical outer tube monitoring device can have a number of video cameras. The video cameras are connected together and combined with a control device of the installation according to the invention in such a way that the installation is immediately stopped if the video cameras detect production defects on the produced multi-layer composite tube.

The installation according to the invention can be precisely set up in a relatively simple fashion without entailing a great deal of time, if there is provided a two-part base device having a first and a second base portion, wherein arranged on the first base portion are the metal strip unwinding device, the metal strip storage device and the extruder station, and arranged on the second base portion are the optical tube monitoring device, the printer, the tube draw-off device and the tube winding-up device, wherein the first and second base portions are connected together by means of the cooling device. The first and second base portions can be in the form of base plates with suitable cavities or shafts—virtually like palettes—in order also to serve to receive the installation materials of the installation according to the invention.

Further details, features and advantages will be apparent from the description hereinafter of an embodiment illustrated in the drawing of the installation according to the invention for producing multi-layer composite tubes. In the drawing:

FIG. 1 is a side view of an embodiment of the installation,

FIG. 2 is a view from above of the installation shown in FIG. 1,

Figure 3:
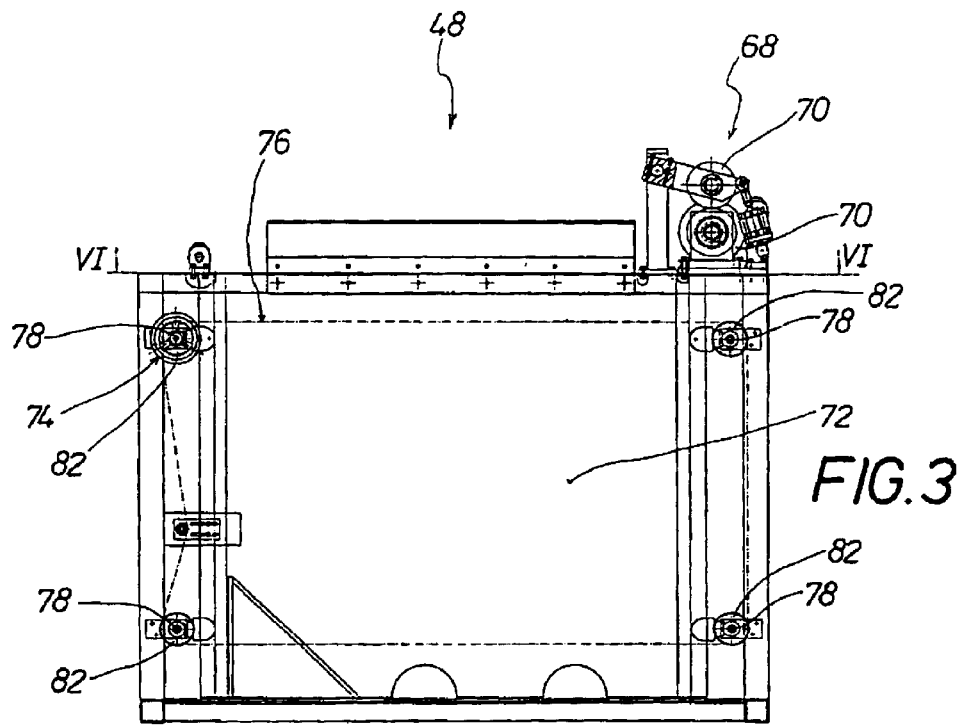
Figure 4:
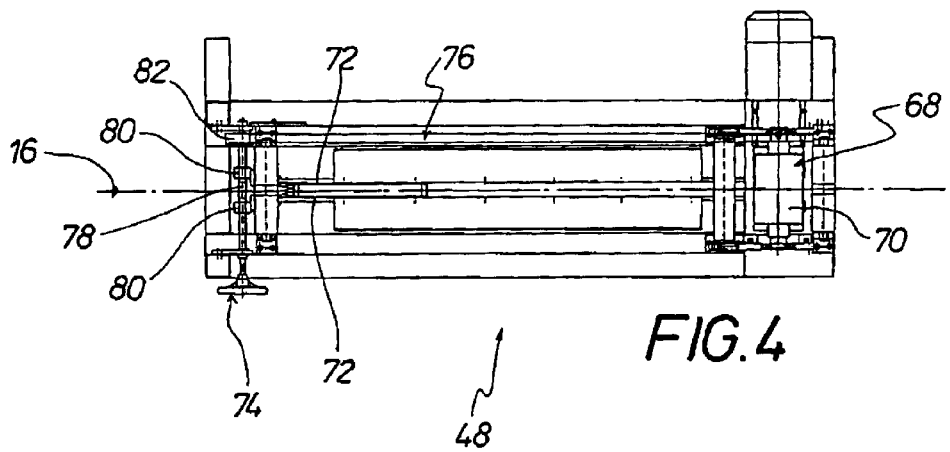
Figure 5:
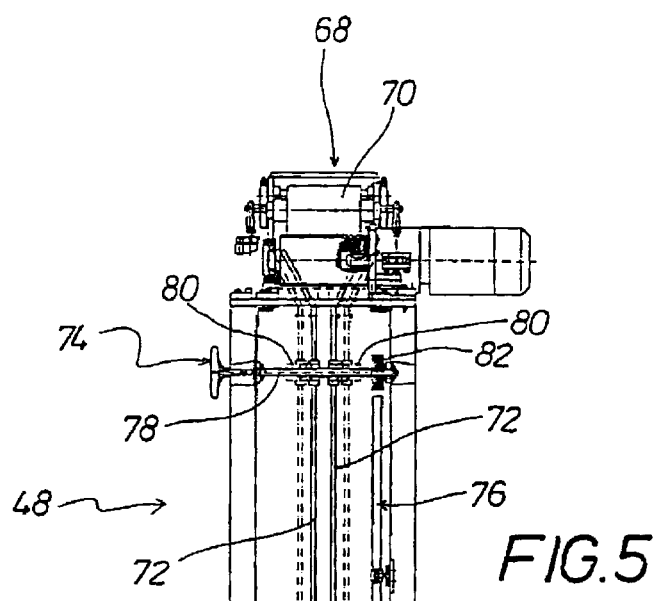
Figure 6:
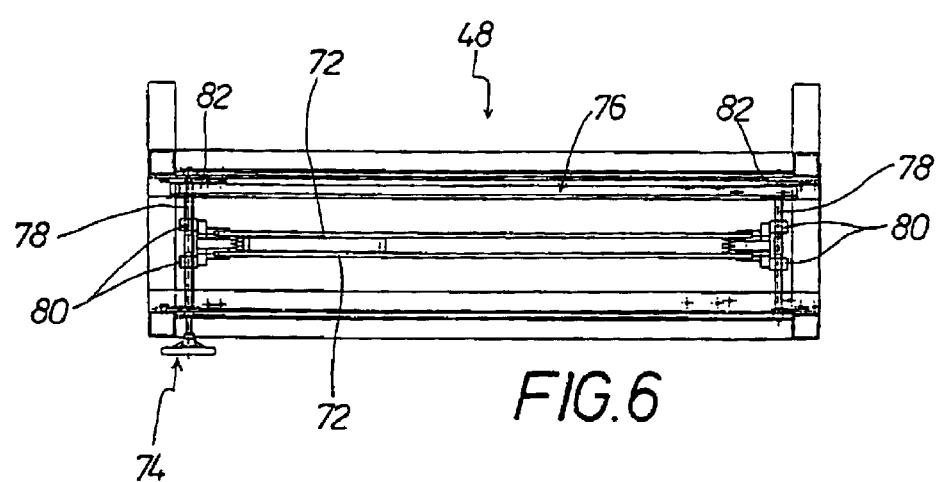
Figure 10:
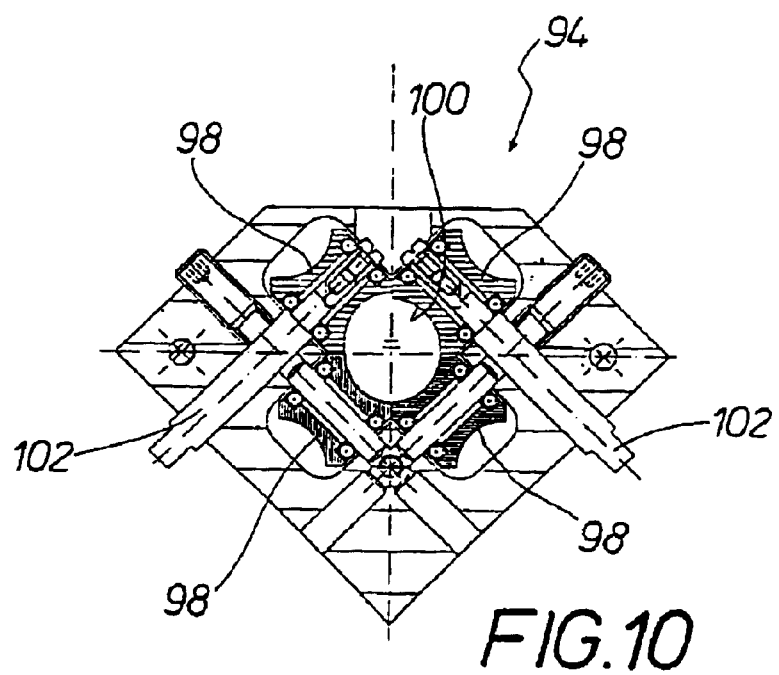
Figure 11:
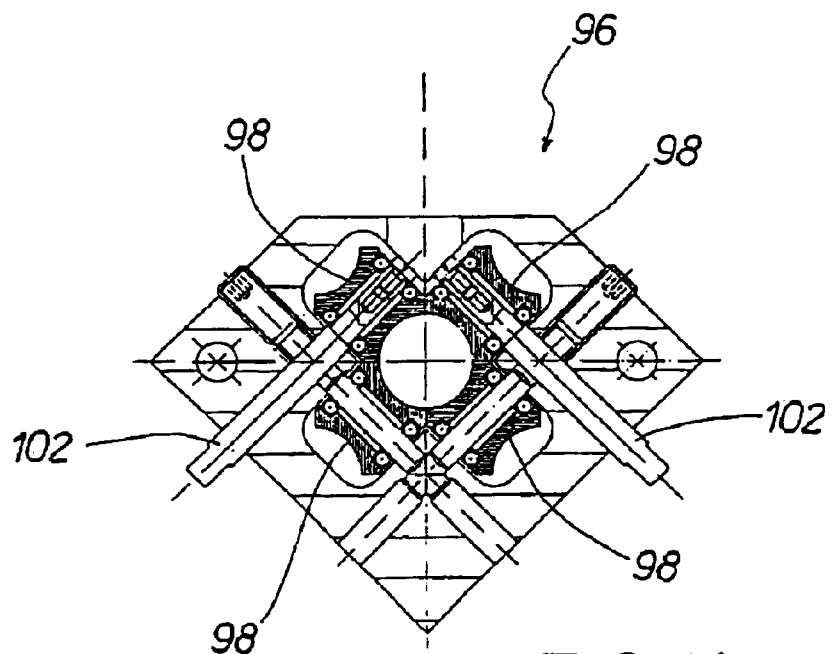
Figure 12:
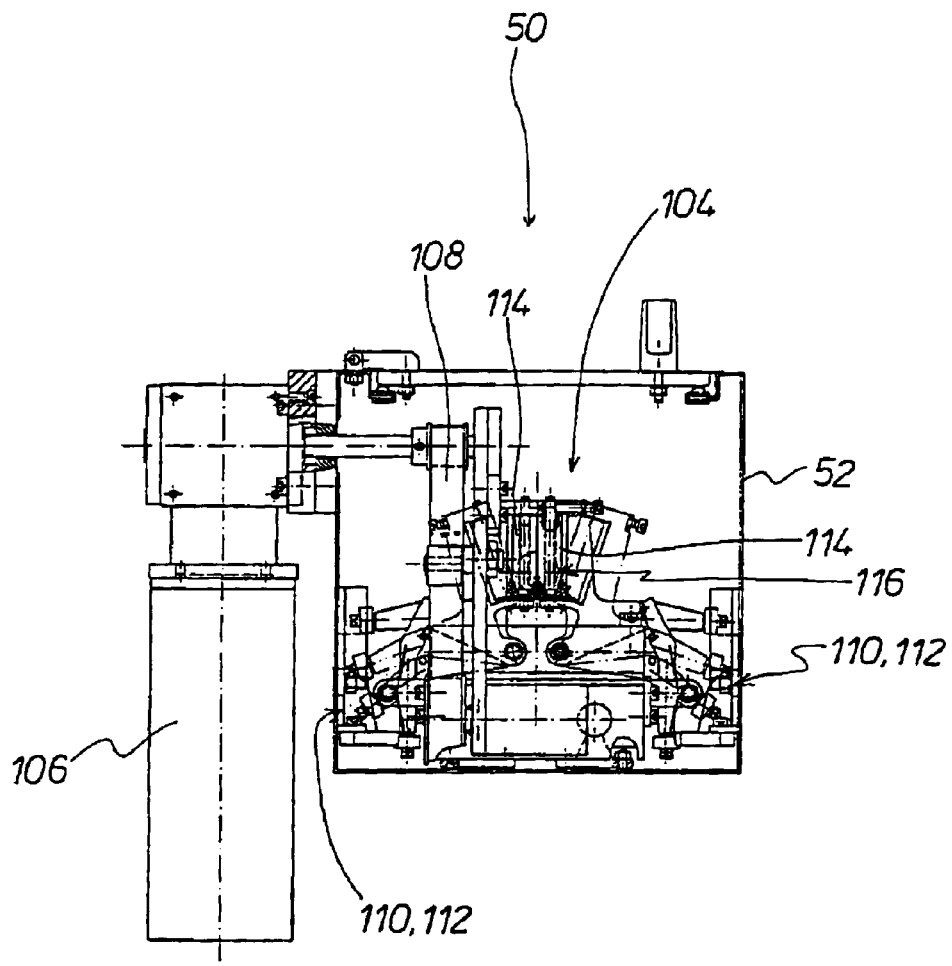
Figure 14:
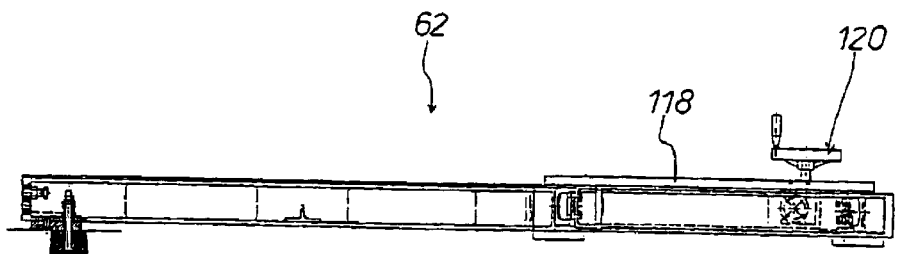
Figure 13:
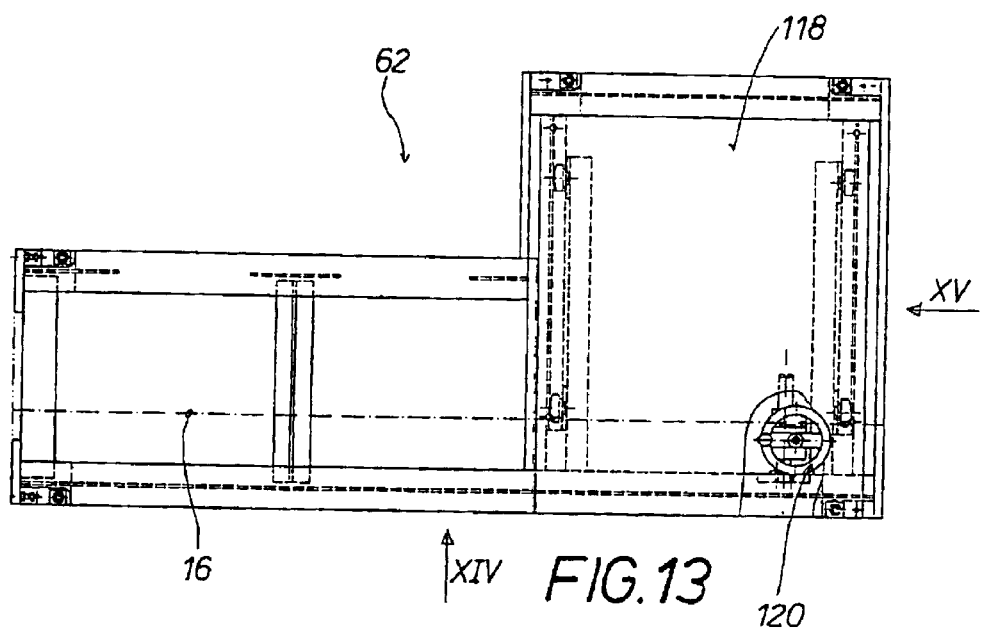
Figure 15:
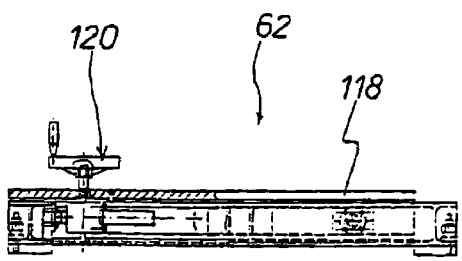

FIG. 3 is a side view of an embodiment of the metal strip storage device of the installation shown in FIGS. 1 and 2, FIG. 4 is a plan view of the metal strip storage device shown in FIG. 3, FIG. 5 is a cut-away front view of the metal strip storage device shown in FIGS. 3 and 4, FIG. 6 is a view of the metal strip storage device viewing in the direction of the arrows VI—VI in FIG. 3, FIG. 7 is a partially cut-away view of part of an embodiment of essential portions of a shaping device of the installation shown in FIGS. 1 and 2 in a side view, FIG. 8 is a view in section taken along line VIII—VIII in FIG. 7, FIG. 9 is a view in section taken along line IX—IX in FIG. 7, FIG. 10 is a sectional view of a first closing roller device of the installation shown in FIGS. 1 and 2, FIG. 11 is a sectional view similar to FIG. 10 of a second closing roller device of the installation shown in FIGS. 1 and 2, FIG. 12 is a front view of an embodiment of a tube clamping-off device provided in a liquid bath of the installation shown in FIGS. 1 and 2, with squeeze-off jaws which are shown in solid lines in the closed squeeze-off position and in broken lines in the opened return transport position, FIG. 13 is a plan view of a first base portion of a two-part base device of the installation shown in FIGS. 1 and 2, FIG. 14 is a view of the base portion of FIG. 13 viewing in the direction of the arrow XIV, and FIG. 15 is a partly cut-away view of the second base portion of FIG. 13 viewing in the direction of the arrow XV.

FIGS. 1 and 2 are a side view and a view from above of an embodiment of the installation 10 for producing multi-layer composite tubes. The installation 10 has an extruder station 12 which forms the heart of the installation 10. The extruder station 12 has a stationary extrusion head 14 which determines a location of a production line 16 of the installation 10, as indicated by a dash-dotted line. Associated with the extrusion head 14 is a first extruder 18 and a second extruder 20. The first extruder 18 serves for the production of an inner plastic layer and the second extruder serves for the production of an outer plastic layer on a metal tube. The first and second extruders 18 and 20 are provided laterally beside the production line 16 in parallel relationship therewith and are arranged facing towards each other. The extrusion head 14 is disposed centrally and laterally displaced between the first and second extruders 18 and 20. As can be clearly seen from FIG. 2 such an arrangement saves space and floor area.

So that the inner plastic layer and the outer plastic layer can be applied in firmly adhering relationship to the metal tube, the extruder station 12 has a third extruder 22 and a fourth extruder 24 for bonding agent, which like the first and second extruders 18 and 20 are connected to the stationarily provided extrusion head 14 of the extruder station 12. The third and fourth extruders 22 and 24 are cardanically mounted to associated column elements 26 and are thus simply precisely adjustable in relation to the extrusion head 14. The third and fourth extruders 22 and 24 are disposed on the same side of the production line 16 as the first and second extruders 18 and 20 so that access to the extrusion head 14 is advantageously possible without any problem.

The production direction of the installation 10 is indicated by the arrow 28 in FIGS. 1 and 2. Associated with the extrusion head 14 is a welding device 30 of a welding station 32 which has an ultrasound welding wheel which is controlledly driven by a drive motor 34. The ultrasound welding wheel is displaceable as desired in relation to the extrusion head 14 in a first direction x in-space parallel to the production line 16 and in a second direction y in space which is perpendicular to the first direction x. The first direction in space which is indicated by the double-headed arrow x is in the plane of the drawing in FIG. 1 and in the plane of the drawing in FIG. 2. The second direction y in space which is perpendicular thereto is in the plane of the drawing in FIG.

2 and is oriented perpendicularly to the plane of the drawing in FIG. 1. The second direction y in space is therefore oriented in a horizontal plane transversely with respect to the production line 16. In FIG. 1 a vertical direction z in space which is perpendicular to the first and second directions x and y is indicated by a corresponding double-headed arrow. The third direction z in space is oriented perpendicularly to the plane of the drawing in FIG. 2 and is in the plane of the drawing in FIG. 1. The ultrasound welding wheel of the welding device 30 is not only linearly displaceable in the first direction x and in the second direction y, as has already been stated above, but it is also pivotable as desired about a pivot axis oriented in the second direction y in space. The welding device 30 is therefore advantageously highly mobile and consequently can be very exactly arranged on the production line.

Provided upstream of the welding station 32 in the production direction indicated by the arrow 28 is a metal strip shaping station 36 which serves to shape a metal strip 38 (see FIG. 1) into the form of a metal tube. The metal strip 38 which is to be shaped into the metal tube is unwound from a reel 40 which is provided on a reel mounting 52 of a metal strip unwinding device 44. The metal strip unwinding device 44 has a support element 46 which has two reel mountings 42. The two reel mountings 42 are disposed in diametrally opposite relationship, as can be seen from FIG. 2. The one reel mounting 42 is disposed on the production line 16 and the second reel mounting is disposed outside the production line 16 and can be fitted with an unused fresh metal strip reel during the unwinding of the metal strip reel which is on the production line 16. The support element 46 of the metal strip unwinding device 44 is adjustable in the second direction y in space in order to provide for alignment of the corresponding reel mounting 42 in relation to the production line 16.

A metal strip storage device 48 is disposed between the metal strip unwinding device 44 and the shaping device 36. As can be seen from FIG. 1 the metal strip storage device 48 is provided for the intermediate storage in particular of an end portion of an exhausted metal strip reel 40, to arrange an unused fresh metal strip reel in the production line 16, and to mechanically fixedly connect the leading end portion of the winding of the unused fresh metal strip reel to the end of the exhausted metal strip reel, without having to stop the installation. During that operation of connecting the above-mentioned ends of the strips the corresponding portion of the metal strip 38 is taken from the metal strip storage device 48.

Downstream of the extruder station 12 the installation 10 has a cooling device 50 with an elongate liquid bath 52. Arranged downstream of the liquid bath 52 of the cooling device 50 in the production direction 28 is an optical tube monitoring device 54, a printer 56, a tube draw-off device 58 and a tube winding-up device 60.

The metal strip unwinding device 46, the metal strip storage device 48 and the extruder station 12 are arranged on a first base portion 62. The optical tube monitoring device 54, the printer 56, the tube draw-off device 58 and the tube winding-on device 60 are arranged on a second base portion 64. The first and second base portions 62 and 64 form a two-part base device 66. The first and second base portions 62 and 64 are spaced from each other and are connected together by the cooling device 50.

FIGS. 3, 4, 5 and 6 show an embodiment of the metal strip storage device 48 with a drive or braking device 68 with two rollers 70, between which the metal strip 38 which is to be shaped to form a metal tube (see FIG. 1) is moved in a defined fashion. The metal strip storage device 48 has two mutually parallel vertical side walls 72 which are simultaneously displaceable in mirror image relationship with the production line 16 (see FIG. 4) in order to adapt the internal spacing between the two side walls 72 to the width of the respective metal strip 38. A hand wheel 74 which is connected to an endless belt 76 serves for defined displacement as desired of the two side walls 72. The endless belt 76 is passed around four screw spindles 78 which respectively have a right-hand screwthread and spaced therefrom a left-hand screwthread. The right-hand screwthread portion and the left-hand screwthread portion are respectively screwed through an associated nut element 80 fixed to the corresponding side wall 72. The endless belt 76 is for example a toothed belt which is passed around toothed pulleys 82 secured to the screw spindles 78. When the hand wheel 74 is rotated the screw spindles 78 are simultaneously driven by means of the endless belt 76, involving a screw movement of the screw spindles 78 through the nut elements 80 and consequently a simultaneous movement of the two vertical side walls 72 of the metal strip storage device 48 towards or away from each other. The lateral spacing of the two side walls 72 with respect to the central production line 16 therefore remains constant, that is to say, irrespective of the respective internal distance between the two side walls 72 the production line 16 is precisely in the center between the two side walls 72.

FIGS. 7, 8 and 9 show an embodiment of a base element 84 of the shaping device 36 of the installation 10. The base element 84 has a profile element 86 which is shown in cut-away form in FIG. 7, with longitudinally channels 88 (see FIGS. 8 and 9). Pairs of shaping rollers (not shown) are arranged displaceably in the first direction x in space in per se known manner on the base element 84. The base element 84 is provided on mounting devices 88. Each of the two mounting devices 88 has a hand wheel 90 for adjustment of the base element 84 in the third direction z in space and a hand wheel 92 for adjustment of the base element 84 in the second direction y in space, wherein suitable actuation of the one and/or the other hand wheel 90, 92 of the one and/or the other mounting device 88 not only permits linear adjustment in the second and/or third directions y and/or z, but in addition the base element 84 of the shaping device 36 can be pivoted as desired about a pivot axis oriented in the second direction y and/or about a pivot axis oriented in the third direction z in order to permit exact alignment of the base element 84 in relation to the production line 16.

FIG. 10 is a sectional view of an embodiment of a closing roller device 94 which is arranged adjacent to the welding device 30 of the installation 10. FIG. 11 is a sectional view similar to FIG. 10 showing a second closing roller device 96 which is arranged in the production direction downstream of the first closing roller device 94 in the production line 16. Each of the two closing roller devices 94 and 96 has closing rollers 98 which are mutually adjoining. The closing rollers 98 of the first closing roller device 94 establish a spiral contour which is matched to the spiral shape of the metal tube preform or blank. The closing rollers 98 of the second closing roller device 96 define the outside diameter of the metal strip 38 which has been shaped to form the metal tube, with mutually overlapping longitudinal edges. A part of the closing rollers 98 of the first and second closing roller devices 94 and 96 are radially displaceable in relation to the production line 16. For that purpose they are mounted eccentrically at adjustment spindles 102.

FIG. 12 is a cut-open end view of the liquid bath 52 of the cooling device 50. Arranged in the elongate liquid bath 52 is a tube clamping-off device 104 which is displaceable with a reciprocating movement in the longitudinal direction of the liquid bath 52, that is to say perpendicularly to the plane of the drawing in FIG. 12. For that purpose, the tube clamping-off device 105 is connected to a drive 106 by way of an endless drive belt 108. A first actuating device 110 is arranged at the beginning of the elongate liquid bath 52. A second actuating device 112 is arranged at the end of the elongate liquid bath 52. The first actuating device 110 is provided to move the squeeze-off jaws 114 of the tube clamping-off device 104 towards each other in the production line 16 in order to squeeze off and close the metal composite tube 116 disposed between them. The squeeze-off jaws 114 then remain closed, that is to say, they move, clamped to the metal composite tube, with the metal composite tube as it advances along the production line 16. When, at the end of the elongate liquid bath 52, the tube clamping-off device 104 reaches the second actuating device 52, then by means thereof the squeeze-off jaws 114 of the tube clamping-off device 104 are opened, whereupon the tube clamping-off device 106 is moved back again by means of the drive 106 into its initial position, that is to say at the beginning of the elongate liquid bath 52. The tube clamping-off device 104 therefore performs so-to-speak a pilgrim-type stepping movement.

FIG. 13, 14 and 15 show an embodiment of the first base portion 62 of the two-part base device 66 of the installation 10 shown in FIGS 1 and 2. A base plate 118 is displaceable definedly as desired on the base portion 62 in the second direction y in space by means of a hand wheel 120 in order to align the support element 46, which is fixed on the base plate 118, of the metal strip unwinding device 44 (see FIGS. 1 and 2), that is to say the corresponding side 40, exactly with respect to the production line 16.

What is claimed is:

1. An installation for producing multi-layer composite tubes (16), comprising a shaping device (36) for shaping a metal strip (38) into a metal tube with overlapping longitudinal edges, a welding device (30) for welding the overlapping longitudinal edges, an extruder station (12) with an extrusion head (14) which adjoins the shaping device (36) and which is connected to a first extruder (18) for applying an inner plastic layer and a second extruder (20) for applying an outer plastic layer to the metal tube, and a cooling device (50) for cooling the multi-layer composite tube (116) produced, wherein the extrusion head (14) of the extruder station (12) is disposed stationarily and the first and the second extruders (18 and 20) are arranged in mutual alignment in a line laterally beside the extrusion head (14) in parallel relationship with the production line (16), wherein the extrusion head (14) in the production line (16) is provided between the first and the second extruders (18, 20), characterised in that a third and a fourth extruder (22 and 24) for bonding agent are mounted to associated stationary column devices (26), wherein the third extruder (22) is associated with the first extruder (18) and the fourth extruder (24) is associated with the second extruder (20), and further characterised in that arranged adjacent to the welding device (30) are two closing roller devices (94, 96) which each have more than two closing rollers (98) which are distributed at the periphery and which mutually adjoin.

2. An installation as set forth in claim 1 characterised in that at least two of the closing rollers (98) of the respective closing roller device (94, 96) are radially adjustable.

3. An installation for producing multi-layer composite tubes (16), comprising a shaping device (36) for shaping a metal strip (38) into a metal tube with overlapping longitudinal edges, a welding device (30) for welding the overlapping longitudinal edges, an extruder station (12) with an extrusion head (14) which adjoins the shaping device (36) and which is connected to a first extruder (18) for applying an inner plastic layer and a second extruder (20) for applying an outer plastic layer to the metal tube, and a cooling device (50) for cooling the multi-layer composite tube (116) produced, wherein the extrusion head (14) of the extruder station (12) is disposed stationarily and the first and the second extruders (18 and 20) are arranged in mutual alignment in a line laterally beside the extrusion head (14) in parallel relationship with the production line (16), wherein the extrusion head (14) in the production line (16) is provided between the first and the second extruders (18, 20), characterised in that a third and a fourth extruder (22 and 24) for bonding agent are mounted to associated stationary column devices (26), wherein the third extruder (22) is associated with the first extruder (18) and the fourth extruder (24) is associated with the second extruder (20), further characterised in that arranged adjacent to the welding device (30) are two closing roller devices (94, 96) which each have more than two closing rollers (98) which are distributed at the periphery and which mutually adjoin, and further characterised in that the shaping device (36) has a base element (84) on which pairs of shaping rollers are arranged in succession at mutual spacings in the advance direction of the metal strip (38) to be shaped, wherein the base element (84) is displaceable in a transverse direction and a vertical direction with respect to the production line (16) and is pivotable about a pivot axis oriented in the transverse direction and about a pivot axis oriented in the vertical direction.

4. An installation as set forth in claim 3 characterised in that the welding device (30) has a welding station (32) with an ultrasound welding wheel, wherein the welding station (32) is displaceable with respect to the extrusion head (14) in a first direction in space (x) parallel to the production line (16), in a second direction in space (y) perpendicular thereto transversely with respect to the production line (16) and in a third direction in space (z) perpendicular to the first and the second directions in space (x and y) and is pivotable about a pivot axis oriented in the first direction in space (x).

5. An installation as set forth in claim 4 characterised in that the ultrasound welding wheel is connected to a drive motor (34) for the controlled rotary drive thereof.

6. An installation for producing multi-layer composite tubes (16), comprising a shaping device (36) for shaping a metal strip (38) into a metal tube with overlapping longitudinal edges, a welding device (30) for welding the overlapping longitudinal edges, an extruder station (12) with an extrusion head (14) which adjoins the shaping device (36) and which is connected to a first extruder (18) for applying an inner plastic layer and a second extruder (20) for applying an outer plastic layer to the metal tube, and a cooling device (50) for cooling the multi-layer composite tube (116) produced, wherein the extrusion head (14) of the extruder station (12) is disposed stationarily and the first and the second extruders (18 and 20) are arranged in mutual alignment in a line laterally beside the extrusion head (14) in parallel relationship with the production line (16), wherein the extrusion head (14) in the production line (16) is provided between the first and the second extruders (18, 20), characterised in that a third and a fourth extruder (22 and 24) for bonding agent are mounted to associated stationary column devices (26), wherein the third extruder (22) is associated with the first extruder (18) and the fourth extruder (24) is associated with the second extruder (20), and further characterized in that the shaping device (36) has a base element (84) on which pairs of shaping rollers are arranged in succession at mutual spacings in the advance direction of the metal strip (38) to be shaped, wherein the base element (84) is displaceable in a transverse direction and a vertical direction with respect to the production line (16) and is pivotable about a pivot axis oriented in the transverse direction and about a pivot axis oriented in the vertical direction.

7. An installation as set forth in claim 6 characterised in that adjusting wheels (90, 92) are provided for displacement in the transverse direction and about the pivot axis oriented in the transverse direction and for displacement in the vertical direction and about the pivot axis oriented in the vertical direction.

8. An installation as set forth in claim 3 characterised in that arranged upstream of the shaping device (36) in the production direction is a metal strip unwinding device (44) which is displaceable in a transverse direction with respect to the production line (16).

9. An installation as set forth in claim 8 characterised in that the metal strip unwinding device (44) has a support element (46) with two reel mountings (42), wherein the support element (46) is rotatable about a vertical axis and the two reel mountings (42) are provided at mutually remote sides of the support element (46).

10. An installation for producing multi-layer composite tubes (16), comprising a shaping device (36) for shaping a metal strip (38) into a metal tube with overlapping longitudinal edges, a welding device (30) for welding the overlapping longitudinal edges, an extruder station (12) with an extrusion head (14) which adjoins the shaping device (36) and which is connected to a first extruder (18) for applying an inner plastic layer and a second extruder (20) for applying an outer plastic layer to the metal tube, and a cooling device (50) for cooling the multi-layer composite tube (116) produced, wherein the extrusion head (14) of the extruder station (12) is disposed stationarily and the first and the second extruders (18 and 20) are arranged in mutual alignment in a line laterally beside the extrusion head (14) in parallel relationship with the production line (16), wherein the extrusion head (14) in the production line (16) is provided between the first and the second extruders (18, 20), and further characterised in that a third and a fourth extruder (22 and 24) for bonding agent are mounted to associated stationary column devices (26), wherein the third extruder (22) is associated with the first extruder (18) and the fourth extruder (24) is associated with the second extruder (20), further characterised in that a metal strip unwinding device (44) has a support element (46) with two reel mountings (42), wherein the support element (46) is rotatable about a vertical axis and the two reel mountings (42) are provided at mutually remote sides of the support element (46), and further characterised in that provided between the metal strip unwinding device (44) and the metal strip shaping device (36) is a metal strip storage device (48) which has two vertical side walls (72) which are arranged parallel to each other and to the production line (16).

11. An installation as set forth in claim 10 characterised in that the two side walls (72) of the metal strip storage device (48) are simultaneously displaceable symmetrically in mirror-image relationship with respect to the production line (16).

12. An installation as set forth in claim 3 characterised in that the cooling device (50) has an elongate liquid bath (52) with a nozzle device and with composite tube hold-down devices, wherein the nozzle device is formed with mutually spaced nozzle openings which are directed towards the production line (16).

13. An installation as set forth in claim 12 characterised in that the respective composite tube hold-down device has two mutually spaced rollers which are mounted on a pivotal lever.

14. An installation for producing multi-layer composite tubes (16), comprising a shaping device (36) for shaping a metal strip (38) into a metal tube with overlapping longitudinal edges, a welding device (30) for welding the overlapping longitudinal edges, an extruder station (12) with an extrusion head (14) which adjoins the shaping device (36) and which is connected to a first extruder (18) for applying an inner plastic layer and a second extruder (20) for applying an outer plastic layer to the metal tube, and a cooling device (50) for cooling the multi-layer composite tube (116) produced, wherein the extrusion head (14) of the extruder station (12) is disposed stationarily and the first and the second extruders (18 and 20) are arranged in mutual alignment in a line laterally beside the extrusion head (14) in parallel relationship with the production line (16), wherein the extrusion head (14) in the production line (16) is provided between the first and the second extruders (18, 20), characterised in that a third and a fourth extruder (22 and 24) for bonding agent are mounted to associated stationary column devices (26), wherein the third extruder (22) is associated with the first extruder (18) and the fourth extruder (24) is associated with the second extruder (20), further characterized in that the cooling device (50) has an elongate liquid bath (52) with a nozzle device and with composite tube hold-down devices, wherein the nozzle device is formed with mutually spaced nozzle openings which are directed towards the production line (16), and further characterised in that provided in the liquid bath (52) is a tube clamping-off device (104) which is reciprocatable along the liquid bath (52) and has squeeze-off jaws (114), and that provided at the beginning of the liquid bath (52) is a first actuating device (110) for closing and keeping closed the squeeze-off jaws (114) and provided at the end of the liquid bath (52) is a second actuating device (112) for opening and for keeping open the squeeze-off jaws (114).

15. An installation as set forth in claim 3 characterised in that provided downstream of the cooling device (50) in the production direction (28) is an optical tube monitoring device (54), a printer (56), a tube draw-off device (58) and a tube winding-on device (60).

16. An installation as set forth in claim 15 characterised in that the optical tube monitoring device (54) has a number of video cameras.

17. An installation for producing multi-layer composite tubes (16), comprising a shaping device (36) for shaping a metal strip (38) into a metal tube with overlapping longitudinal edges, a welding device (30) for welding the overlapping longitudinal edges, an extruder station (12) with an extrusion head (14) which adjoins the shaping device (36) and which is connected to a first extruder (18) for applying an inner plastic layer and a second extruder (20) for applying an outer plastic layer to the metal tube, and a cooling device (50) for cooling the multi-layer composite tube (116) produced, wherein the extrusion head (14) of the extruder station (12) is disposed stationarily and the first and the second extruders (18 and 20) are arranged in mutual alignment in a line laterally beside the extrusion head (14) in parallel relationship with the production line (16), wherein the extrusion head (14) in the production line (16) is provided between the first and the second extruders (18, 20), characterised in that a third and a fourth extruder (22 and 24) for bonding agent are mounted to associated stationary column devices (26), wherein the third extruder (22) is associated with the first extruder (18) and the fourth extruder (24) is associated with the second extruder (20), and further characterised in that there is provided a two-part base device (66) comprising a first base portion (62) and a second base portion (64), wherein arranged on the first base portion (62) are a metal strip unwinding device (44), a metal strip storage device (48) and the extruder station (12), arranged on the second base portion (64) are an optical tube monitoring device (54), a printer (56), a tube draw-off device (58) and a tube winding-on device (60), and the first and second base portions (62, 64) are connected together by means of the cooling device (50).

* * * * *